United States Patent
Jang et al.

(10) Patent No.: US 8,456,594 B2
(45) Date of Patent: Jun. 4, 2013

(54) CHOLESTERIC LIQUID CRYSTAL DISPLAY DEVICES AND METHODS OF MANUFACTURING THE SAME

(75) Inventors: Jae-eun Jang, Seoul (KR); Jae-eun Jung, Seoul (KR); Kyu-young Hwang, Seoul (KR); Jae-hoon Kim, Seoul (KR); Kwang-soo Bae, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 339 days.

(21) Appl. No.: 12/659,558

(22) Filed: Mar. 12, 2010

(65) Prior Publication Data

US 2011/0019132 A1    Jan. 27, 2011

(30) Foreign Application Priority Data

Jul. 22, 2009    (KR) .................. 10-2009-0067011

(51) Int. Cl.
*G02F 1/1333*    (2006.01)
(52) U.S. Cl.
USPC .................... 349/86; 349/76; 349/88; 349/93
(58) Field of Classification Search
None
See application file for complete search history.

(56) References Cited

U.S. PATENT DOCUMENTS

| 5,798,808 | A | * | 8/1998 | Van Haaren et al. | 349/96 |
| 6,143,379 | A | * | 11/2000 | Schoenfeld et al. | 428/1.1 |
| 6,636,291 | B2 | | 10/2003 | Van De Witte et al. | |
| 6,735,009 | B2 | * | 5/2004 | Li | 359/245 |

FOREIGN PATENT DOCUMENTS

| JP | 2003-0344637 | 12/2003 |
| KR | 2002-0062188 | 7/2002 |
| KR | 2003-0010498 | 2/2003 |
| KR | 2003-0017381 | 3/2003 |
| KR | 2004-0080322 | 9/2004 |
| KR | 2008-0014094 | 2/2008 |

* cited by examiner

*Primary Examiner* — Tina Wong
(74) *Attorney, Agent, or Firm* — Harness, Dickey & Pierce, P.L.C.

(57) ABSTRACT

A cholesteric liquid crystal display device includes: a plurality of pixel units arranged two-dimensionally between two transparent substrates. Each of the plurality of pixel units includes a cholesteric liquid crystal layer having a single-layer structure. The cholesteric liquid crystal layer includes: a liquid crystal molecule; a chiral dopant; and an optically polymerizable polymer. The chiral dopant is mixed with the liquid crystal molecule to form a cholesteric phase and has a solubility that varies with respect to the liquid crystal molecule according to temperature. The optically polymerizable polymer is cured to fix a helix pitch of the cholesteric phase.

5 Claims, 9 Drawing Sheets

CHOLESTERIC LIQUID CRYSTAL DISPLAY DEVICES AND METHODS OF MANUFACTURING THE SAME

CROSS-REFERENCE TO RELATED APPLICATION(S)

This application claims priority under 35 U.S.C. §119 to Korean Patent Application No. 10-2009-0067011, filed on Jul. 22, 2009, in the Korean Intellectual Property Office, the disclosure of which is incorporated herein in its entirety by reference.

BACKGROUND

1. Field

Example embodiments relate to cholesteric liquid crystal display devices having a single-layered structure and methods of manufacturing the same.

2. Description of the Related Art

As flexible displays such as electronic paper (e-paper) are actively developed, use of a display device using a cholesteric liquid crystal is receiving more attention.

A cholesteric liquid crystal is a liquid crystal composition formed by twisting a nematic liquid crystal into a helix structure. A cholesteric liquid crystal has a light reflection property, which varies according to a helix pitch. More specifically, light having a given, desired or predetermined wavelength range is selectively reflected according to a helix pitch of a liquid crystal molecule. Thus, a full-color image is produced by controlling a reflection wavelength range by using pixels having different helix pitches. A cholesteric liquid crystal having these display characteristics has relatively clear color display characteristics, relatively high contrast characteristics, and relatively high resolution characteristics. A display device using cholesteric liquid crystals shows relatively high performance.

A method of producing a full-color image using cholesteric liquid crystals is performed in a multilayer manner or a single layer manner. According to the multilayer manner, for example, a red (R) pixel, a green (G) pixel, and a blue (B) pixel are stacked on each other. The red (R) pixel has a helix pitch that is controlled such that light having a red wavelength range is selectively reflected. The green (G) pixel has a helix pitch that is controlled such that light having a green wavelength range is selectively reflected. The blue (B) pixel has a helix pitch that is controlled such that light having a blue wavelength range is selectively reflected. The respective pixels are controlled to be in a wavelength selection reflection mode or transmission mode, according to the application of a voltage, and a color corresponding to a pixel being in the wavelength selection reflection mode is displayed. However, the multilayer manner is relatively complicated and expensive at least because a multi-layer substrate is used. In addition, the multilayer manner also provides relatively low color purity due to a scattering phenomenon that may occur in a pixel that is in the transmission mode.

SUMMARY

Example embodiments provide cholesteric liquid crystal display devices having improved color image quality and methods of manufacturing the same.

At least one example embodiment provides a display device. According to at least this example embodiment, the display device includes: a plurality of pixel units. Each of the pixel units includes a cholesteric liquid crystal layer. The cholesteric liquid crystal layer is interposed between two transparent substrates. The cholesteric liquid crystal layer includes: a liquid crystal molecule; a chiral dopant; and an optically polymerizable polymer. The chiral dopant is mixed with the liquid crystal molecule to form a cholesteric phase. The solubility of the chiral dopant with respect to the liquid crystal molecule varies according to temperature. The optically polymerizable polymer is cured to fix a helix pitch of the cholesteric phase. The pixel units are arranged two-dimensionally and the cholesteric liquid crystal layer of each of the pixel units has a single-layered structure.

According to at least this example embodiment, each of the pixel units may include a plurality of subpixel units. Each of the plurality of subpixel units may have different helix pitches of the cholesteric phase. For example, each of the pixel units may include a red subpixel unit, a green subpixel unit, and a blue subpixel unit. Alternatively, each of the pixel units may include a magenta subpixel unit, a yellow subpixel unit, and a cyan subpixel unit.

Barrier ribs for defining the subpixel units may be further formed between the two transparent substrates. A light absorption layer may be formed on a surface of any one of the transparent substrates.

At least one other example embodiment provides a method of setting a reflection wavelength range of a cholesteric liquid crystal. According to at least this example embodiment, a cholesteric phase is formed by dissolving a chiral dopant in a mixed solution containing an optically polymerizable polymer and a liquid crystal molecule. A helix pitch of the cholesteric phase is changed by changing the temperature of the resultant solution. The optically polymerizable polymer is then cured.

According to at least this example embodiment, the solubility of the chiral dopant with respect to the liquid crystal molecule increases as temperature increases. In changing of the helix pitch of the cholesteric phase, the temperature of the resultant solution may be increased so that the reflection wavelength range may be lowered, or the temperature of the resultant solution may be lowered so that the reflection wavelength range increases.

At least one other example embodiment provides a method of manufacturing a display device. According to at least this example embodiment, a liquid crystal composition is formed between two transparent substrates by dissolving a chiral dopant in a mixed solution containing an optically polymerizable polymer and a liquid crystal molecule. The optically polymerizable polymer contained in a portion of the liquid crystal composition corresponding to a first subpixel unit is cured, and the temperature of the liquid crystal composition is changed to vary the solubility of the chiral dopant. The optically polymerizable polymer contained in a portion of the liquid crystal composition corresponding to a second subpixel unit is then cured. The temperature of the liquid crystal composition is changed to vary the solubility of the chiral dopant and curing the optically polymerizable polymer contained in a portion of the liquid crystal composition corresponding to a third subpixel unit.

In forming of the liquid crystal composition, the mixed solution may be supersaturated with the chiral dopant. In addition, in forming of the liquid crystal composition, the amount of dissolved chiral dopant may be adjusted to set a reflection wavelength range to be a red wavelength range. In this case, in the curing of the optically polymerizable polymer, the temperature of the liquid crystal composition is increased.

In forming the liquid crystal composition, the amount of dissolved chiral dopant may be adjusted to set a reflection wavelength range to be a blue wavelength range. In this case, in curing of the optically polymerizable polymer, the temperature of the liquid crystal composition is lowered.

BRIEF DESCRIPTION OF THE DRAWINGS

Example embodiments will become apparent and more readily appreciated from the following description of the accompanying drawings in which.

DETAILED DESCRIPTION

Detailed illustrative embodiments are disclosed herein. However, specific structural and functional details disclosed herein are merely representative for purposes of describing example embodiments. Inventive concepts may, however, may be embodied in many alternate forms and should not be construed as limited to only the example embodiments set forth herein.

It should be understood that there is no intent to limit inventive concepts to the particular example embodiments disclosed, but on the contrary example embodiments are to cover all modifications, equivalents, and alternatives falling within the scope of inventive concepts. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items.

When an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
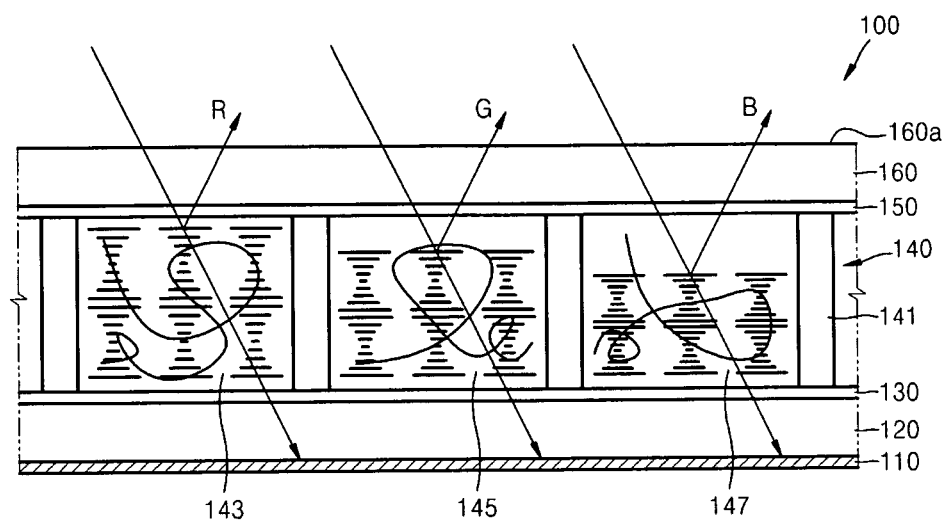
FIG. 1 is a schematic view of a cholesteric liquid crystal display device according to an example embodiment.
Figure 2:
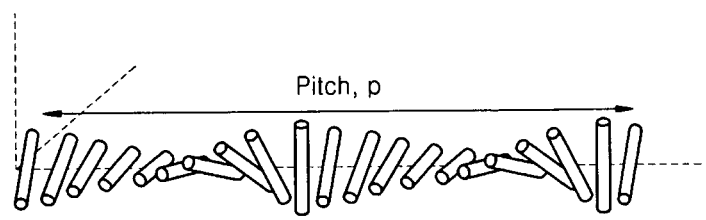
FIG. 2 is a conceptual view to explain an example structure and operation of a cholesteric liquid crystal polymer.

FIG. 1 is a schematic view of a cholesteric liquid crystal display device according to an example embodiment. FIG. 2 is a conceptual view to explain example structure and operation of a cholesteric liquid crystal polymer of the cholesteric liquid crystal layer 140 of the cholesteric liquid crystal display device 100 of FIG. 1.

Referring to FIG. 1, the cholesteric liquid crystal display device 100 a cholesteric liquid crystal layer 140 interposed between transparent substrates 120 and 160.

The cholesteric liquid crystal layer 140 includes: a liquid crystal molecule; a chiral dopant; and an optically polymerizable polymer. The chiral dopant is mixed with the liquid crystal molecule to form a cholesteric phase, and the solubility of the chiral dopant with respect to the liquid crystal molecule varies according to temperature. The optically polymerizable polymer is cured to fix a helix pitch of the cholesteric phase.

When the liquid crystal molecule is mixed with the chiral dopant, a cholesteric liquid crystal polymer having a cholesteric phase, which is twisted into a helix structure, is formed. As illustrated in FIG. 2, the cholesteric liquid crystal polymer is periodically twisted. A repetition length is referred to as a pitch p. Incident light is selectively reflected according to the repeated structure. A reflection wavelength range depends on the pitch p. A wavelength λ corresponding to a maximum reflection is determined according to the following equation: $\lambda = n \cdot p$, where n is an average refractive index of the cholesteric liquid crystal polymer. The pitch p depends on the amount of chiral dopant. In general, the higher the amount of chiral dopant, the shorter the pitch p, and thus, the lower the reflection wavelength range.

Referring back to FIG. 1, the cholesteric liquid crystal layer 140 includes a plurality of subpixel units. The subpixel units include cholesteric liquid crystal polymers having different helix pitches to produce different colors. For example, the cholesteric liquid crystal layer 140 includes: a first subpixel unit 143; a second subpixel unit 145; and a third subpixel unit 147. The first through third subpixel units 143, 145, and 147 make up a pixel unit. The cholesteric liquid crystal display device 100 has a plurality of pixel units arranged on a two-dimensional plane. The cholesteric liquid crystal layer 140 is formed as a single layer and is two-dimensionally divided to form a plurality of pixel regions. However, FIG. 1 illustrates only a single pixel unit.

In the example shown in FIG. 1, the first subpixel unit 143 is a red subpixel unit that has a wavelength range of red light R, the second subpixel unit 145 is a green subpixel unit that has a wavelength range of green light G, and the third subpixel unit 147 is a blue subpixel unit that has a wavelength range of blue light B. However, the first through third subpixel units 143, 145, and 147 are examples. Thus, in other example embodiments, the first through third subpixel units 143, 145, and 147 may be a magenta subpixel unit, a yellow subpixel unit, and a cyan subpixel unit, respectively.

Barrier ribs 141 for defining the first through third subpixel units 143, 145, and 147 may be disposed between the transparent substrates 120 and 160. Due to the formation of the barrier ribs 141, a liquid crystal orientation and a cell gap (e.g., a thickness of the cholesteric liquid crystal layer 140) may be less affected by external elements.

The transparent substrates 120 and 160 may be formed of glass or a transparent plastic material. An outer surface of the transparent substrate 160 may be an image display surface 160a.

A thin film transistor (TFT) layer 130 may be formed on an inner surface of the transparent substrate 120. The TFT layer 130 may include transistors (not shown) for switching individual pixels. A common electrode 150 for generating an electric field in the cholesteric liquid crystal layer 140 together with an output voltage of the transistors may be formed on an inner surface of the transparent substrate 160.

A light absorption layer 110 is formed on a surface (e.g., lower surface) of the transparent substrate 120. In this example, light that penetrates the cholesteric liquid crystal layer 140 (e.g., light other than light in the reflection wavelength range) is absorbed by the light absorption layer 110 and is not reflected towards the image display surface 160a. Thus, the purity of a color displayed on the image display surface 160a is enhanced. Although, the light absorption layer 110 in FIG. 1 is formed on the outer surface of the transparent substrate 120, example embodiments are not limited thereto. For example, in another example embodiment, the light absorption layer 110 may be formed on the inner surface of the transparent substrate 120.

An operation of forming an image by the cholesteric liquid crystal display device 100 will now be described in more detail. The TFT layer 130 performs a switching operation to control the first through third subpixel units 143, 145, and 147 to be in a wavelength selection reflection mode or transmission mode.

When a subpixel is controlled to be in the wavelength selection reflection mode, the subpixel is turned on. If light is incident on the subpixel, only light having a given, desired or predetermined wavelength range is reflected and the remaining light penetrates the subpixel. Thus, the corresponding color is displayed on the image display surface 160a. The light that has penetrated the subpixel is absorbed by the light absorption layer 110 formed on the transparent substrate 120. When a subpixel is controlled to be in the transmission mode, the subpixel is turned off. In this case, the subpixel does not have a reflection property, and thus, incident light penetrates the subpixel and is absorbed by the light absorption layer 110 formed on the transparent substrate 120. In this case, no color is displayed on the image display surface 160a. The image display surface 160a displays an image corresponding to a combination of pixels.

Subpixels are driven in the wavelength selection reflection mode or transmission mode by adjusting the intensity of an electric field formed in the respective subpixels. For example, in the wavelength selection reflection mode, an electric field is applied such that the helix axis of the cholesteric liquid crystal polymer is perpendicular to the transparent substrates 120 and 160. In the transmission mode, an electric field is applied such that the helix axis of the cholesteric liquid crystal polymer is parallel to the transparent substrates 120 and 160.

The cholesteric liquid crystal display device 100 produces a full-color image by using the cholesteric liquid crystal layer 140 having a single-layered structure. In addition, compared to when a multi-layered cholesteric liquid crystal layer is used, the cholesteric liquid crystal display device 100 has a relatively simple structure and produces relatively high color purity. In addition, due to barrier ribs for defining pixels, a liquid crystal orientation or cell gap is not affected by external elements. Furthermore, because light that is not used to form an image is absorbed by the absorption layer 110 formed on the transparent substrate 120, rather than being reflected towards the image display surface 160a, relatively high color purity is obtained.

Hereinafter, a method of manufacturing a cholesteric liquid crystal display device according to an example embodiment will be described in more detail. In this example, the reflection wavelength range of a cholesteric liquid crystal is determined according to the following principle. A chiral dopant is dissolved in a mixed solution containing an optically polymerizable polymer and a liquid crystal molecule to form a cholesteric phase. In some cases, the mixed solution may be supersaturated with the chiral dopant. The temperature of the resultant solution is controlled to change a helix pitch of the cholesteric phase, and the changed helix pitch is fixed by curing the optically polymerizable polymer.

The temperature is adjusted to obtain a desired reflection wavelength range. The solubility of the chiral dopant increases as the temperature is raised. If more chiral dopant is dissolved due to an increase in temperature, the helix pitch of the cholesteric phase is reduced, and thus, the reflection wavelength range is lowered. On the other hand, if the temperature is lowered and some of the dissolved chiral dopant is precipitated, the amount of dissolved chiral dopant is reduced, the helix pitch of the cholesteric phase is increased, and thus, the reflection wavelength range is raised.

FIGS. 3A through 3H are views to explain a method of manufacturing a display device according to an example embodiment.

Figure 3A:
FIGS. 3A through 3H are views to explain a method of manufacturing a display device according to an example embodiment.

As illustrated in FIG. 3A, a transparent substrate 120 is prepared. Barrier ribs 141 for defining pixels are formed on the transparent substrate 120. The transparent substrate 120 may be formed of glass or a transparent plastic material, and a TFT layer 130 including transistors for driving pixels may be formed on the transparent substrate 120. In addition, although not shown, a light absorption layer for absorbing light that is not used to form an image may be formed on a surface (e.g., a lower surface) of the transparent substrate 120.

Figure 3B:
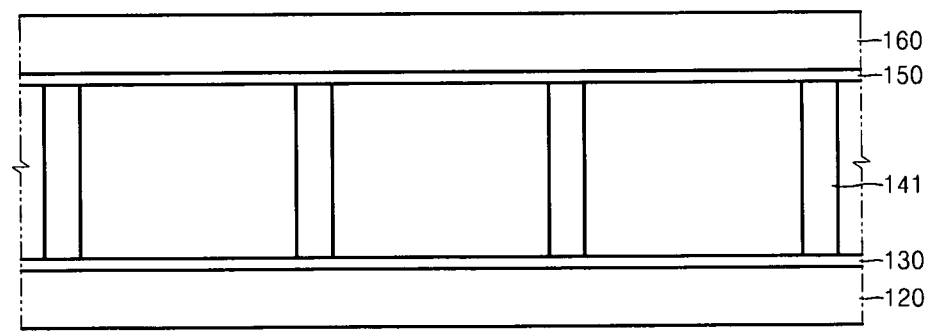

As illustrated in FIG. 3B, a transparent substrate 160 is attached to the barrier ribs 141. In one example, an adhesive (not shown) is coated on the barrier ribs 141 by micro contact printing, and the transparent substrate 160 is attached to the barrier ribs 141 via the adhesive.

Figure 3C:
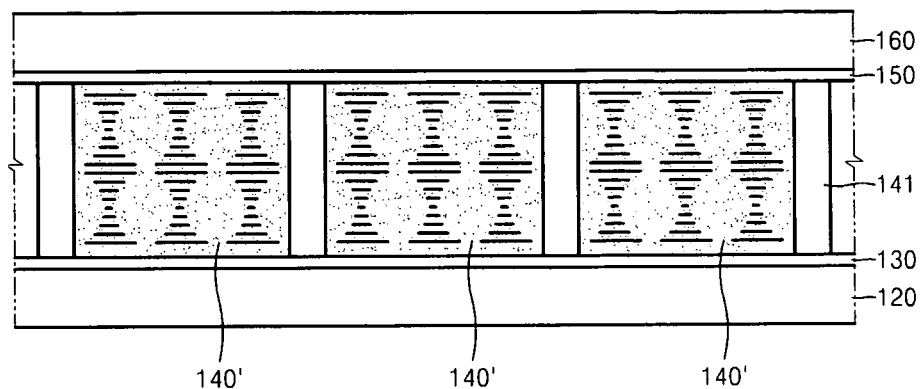

As illustrated in FIG. 3C, a liquid crystal composition 140' is injected into a cell gap. The liquid crystal composition 140' is prepared by dissolving a chiral dopant in a mixed solution containing an optically polymerizable polymer and a liquid crystal molecule. The optically polymerizable polymer may be an ultraviolet (UV) ray curable polymer such as an acrylate-based polymer, but is not limited thereto. The chiral dopant may be a generally known chiral compound that is mirror symmetric. In at least this example embodiment, the chiral dopant is dissolved until the mixed solution is supersaturated with the chiral dopant, and the amount of chiral dopant may be controlled such that the helix pitch of a cholesteric phase formed from the liquid crystal composition 140' corresponds to red light. Because the solubility of the chiral dopant varies according to temperature, the temperature is controlled such that the amount of dissolved chiral dopant corresponds to the helix pitch of a cholesteric phase formed from the liquid crystal composition 140' corresponding to the red light, while the supersaturation state of the chiral dopant is maintained in the liquid crystal composition 140'.

Figure 3D:
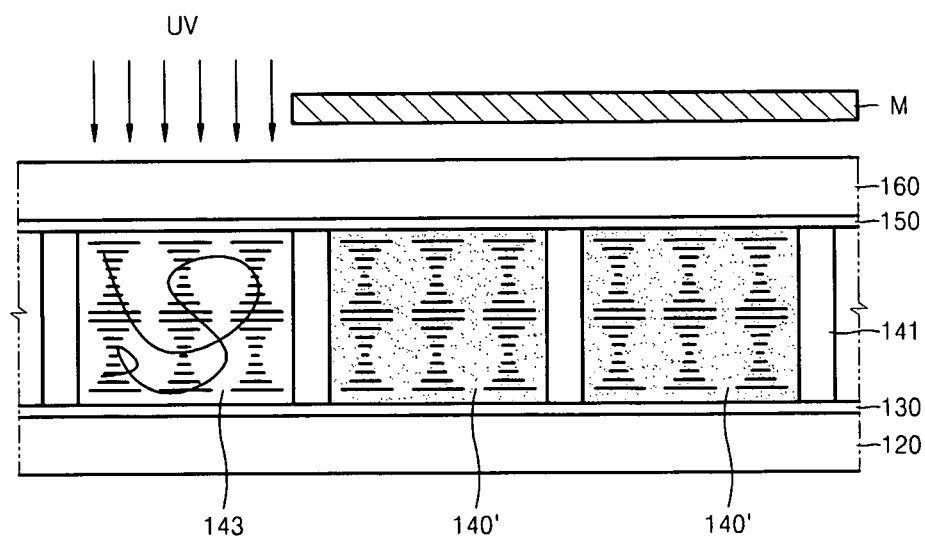

As illustrated in FIG. 3D, the optically polymerizable polymer included in a portion of the liquid crystal composition 140' corresponding to a first subpixel unit 143 is cured. In this example operation, the temperature set with reference to FIG. 3C is maintained constant or substantially constant. The first subpixel unit 143 is formed using a mask M that exposes only the portion of the liquid crystal composition 140' corresponding to the first subpixel unit 143 to irradiation of ultraviolet (UV) rays. Thus, the optically polymerizable polymer included in the UV rays-exposed region is cured, and a helix pitch is fixed such that the reflection wavelength range corresponds to red light.

Figure 3E:
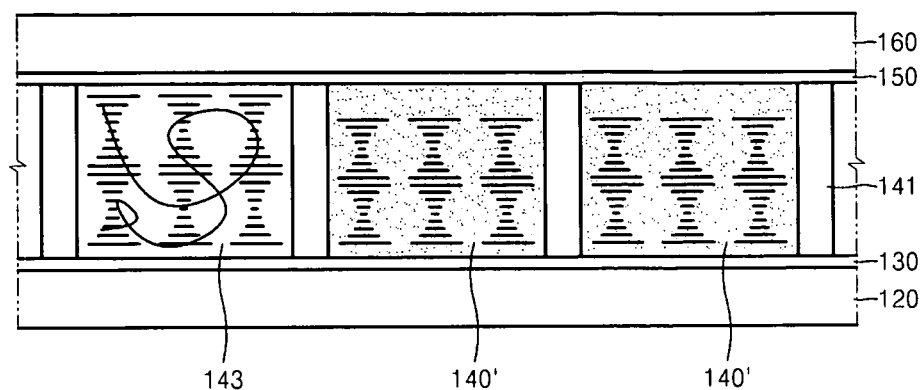

Referring to FIG. 3E, the temperature of the liquid crystal composition 140' is raised to change the solubility of the chiral dopant. Because the solubility of the chiral dopant increases as the temperature is raised, the chiral dopant which is not dissolved due to the supersaturation is further dissolved. In general, when the amount of chiral dopant in the liquid crystal composition 140' is increased, the helix pitch of the cholesteric phase is reduced. Thus, the temperature is controlled such that the amount of chiral dopant is adjusted to obtain a helix pitch that corresponds to a reflection wavelength range corresponding to green light. In this case, the temperature change does not affect the helix pitch of the first subpixel unit 143 that has been fixed by curing the optically polymerizable polymer.

Figure 3F:
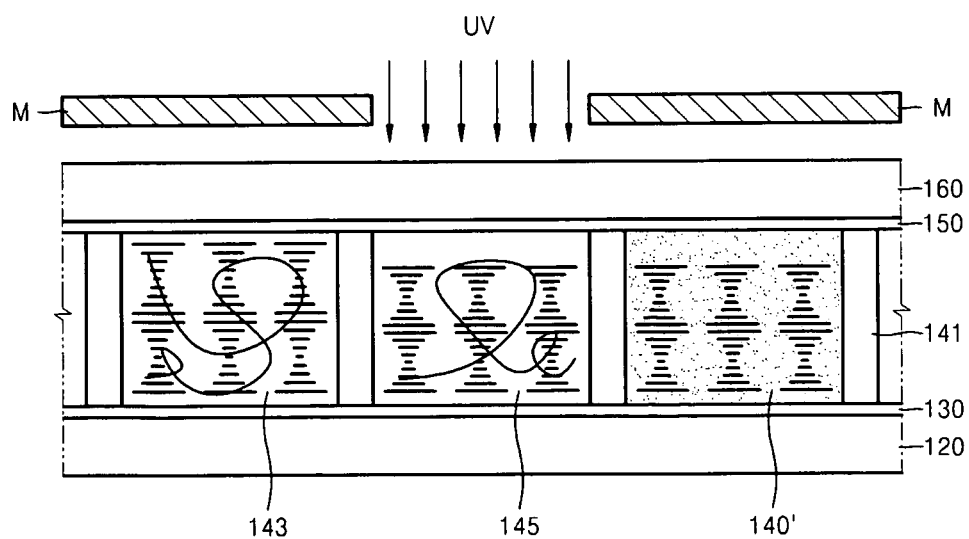

As illustrated in FIG. 3F, UV rays are irradiated through a mask M that exposes only a portion of the liquid crystal composition 140' corresponding to a second subpixel unit 145. In this operation, the temperature used in the operation described with reference to FIG. 3E is maintained constant or substantially constant. In some cases, this operation may be performed together (e.g., concurrently or simultaneously) with the operation described with reference to FIG. 3E. The optically polymerizable polymer in the UV-exposed region is cured and a helix pitch is fixed, thereby forming the second subpixel unit 145 having the reflection wavelength range corresponding to green light. Although, in FIG. 3F, the mask M exposes only the portion of the liquid crystal composition 140' corresponding to the second subpixel unit 145, the mask M may also expose the first subpixel unit 143 because the reflection wavelength range of the first subpixel unit 143 that has been formed by curing with UV rays is not affected by additional irradiation of UV rays.

Figure 3G:
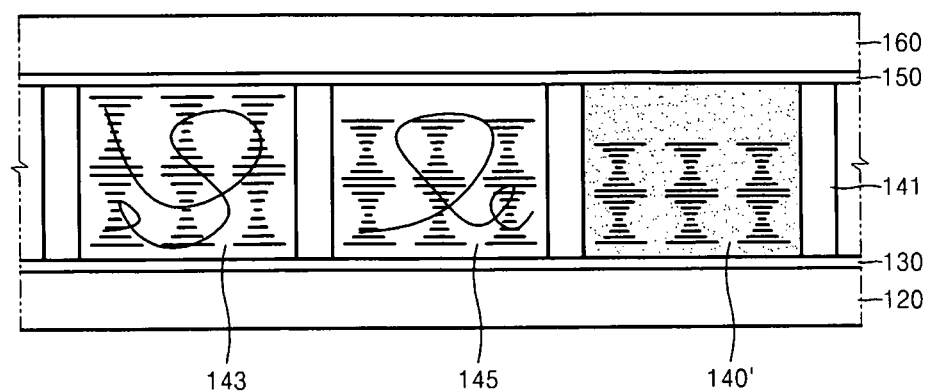

As illustrated in FIG. 3G, the temperature of the liquid crystal composition 140' is further raised to dissolve additional chiral dopant. In this case, the temperature is controlled such that the amount of chiral dopant is adjusted to obtain a helix pitch having a reflection wavelength range corresponding to blue light. In this case, the temperature change does not affect the helix pitches of the first subpixel unit 143 and second subpixel unit 145, which have been fixed by curing the optically polymerizable polymer.

Figure 3H:
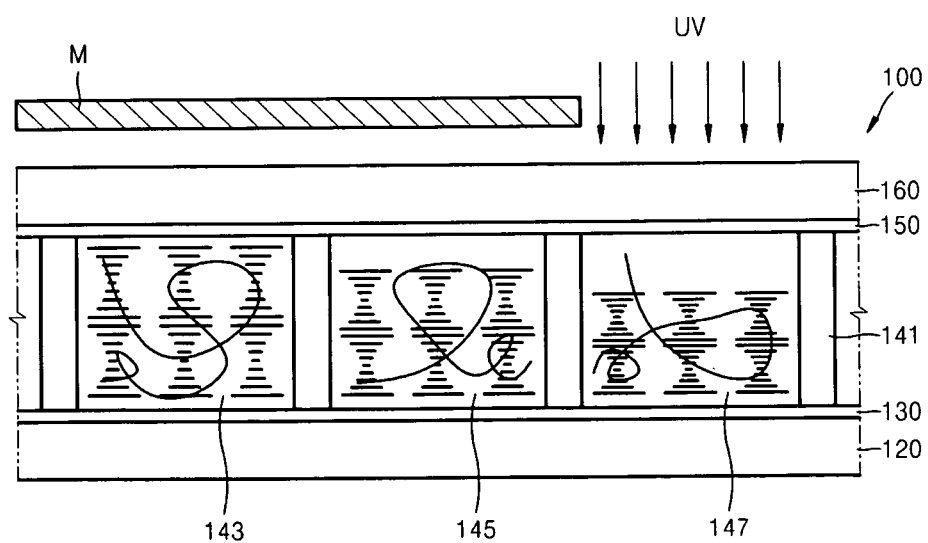

As illustrated in FIG. 3H, UV rays are irradiated through a mask M that exposes only a portion of the liquid crystal composition 140' corresponding to a third subpixel unit 147. In this operation, the temperature used in the operation described with reference to FIG. 3G is maintained constant or substantially constant. In some cases, this operation may be performed together with the operation described with reference to FIG. 3G. The optically polymerizable polymer in the UV-exposed region is cured and a helix pitch is fixed, thereby forming the third subpixel unit 147 having the reflection wavelength range corresponding to blue light. This operation may be performed without the mask M because the reflection wavelength ranges of the first subpixel unit 143 and second subpixel unit 145, which have been formed by curing with UV rays, are not affected by additional irradiation of UV rays.

FIGS. 4A through 4G are views to explain a method of manufacturing a display device according to another example embodiment.

Figure 4A:
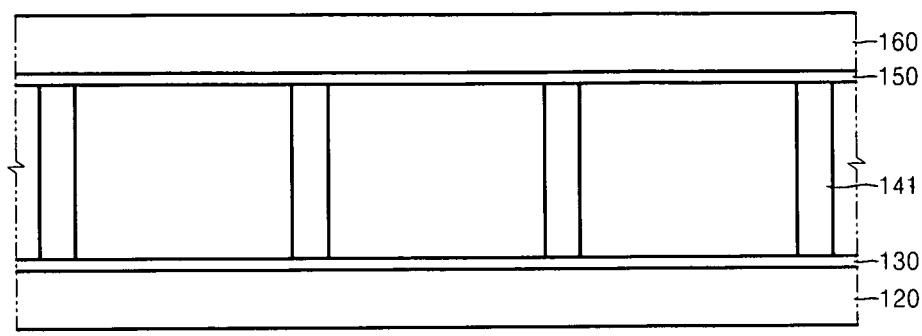
FIGS. 4A through 4G are views to explain a method of manufacturing a display device according to another example embodiment.

The cell gap structure illustrated in FIG. 4A is similar to that described with reference to FIGS. 3A and 3B. In at least this example embodiment, although not illustrated, a light absorption layer for absorbing light, which is not used to form an image, may be formed on a surface of the transparent substrate 120.

Figure 4B:
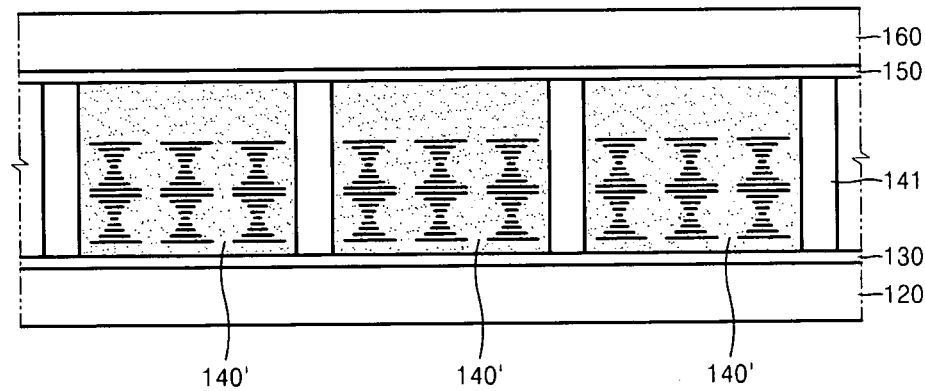

As illustrated in FIG. 4B, the liquid crystal composition 140' is injected into a cell gap. The liquid crystal composition 140' is prepared by dissolving a chiral dopant in a mixed solution containing an optically polymerizable polymer and a liquid crystal molecule. The amount of dissolved chiral dopant may be controlled such that a helix pitch of a cholesteric phase formed from the liquid crystal composition 140' corresponds to blue light.

Figure 4C:
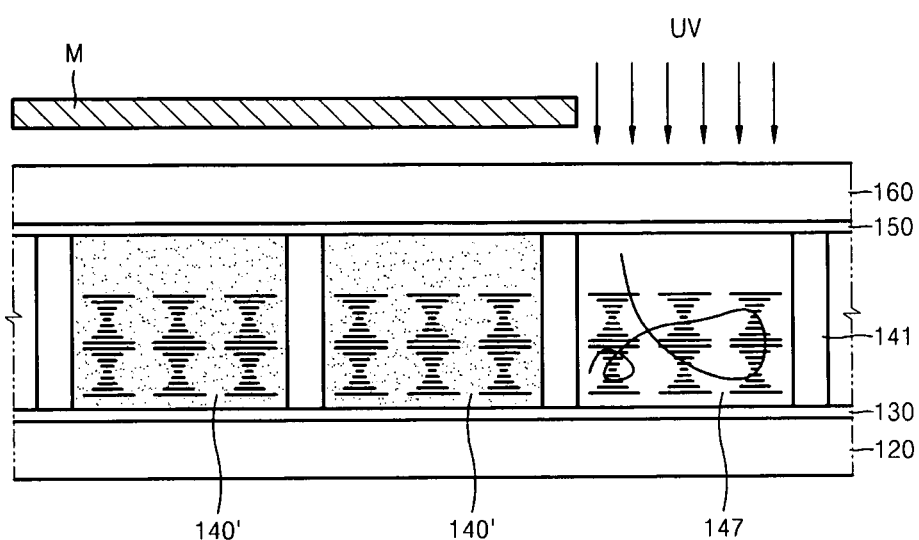

Referring to FIG. 4C, the optically polymerizable polymer contained in the portion of the liquid crystal composition 140' corresponding to the third subpixel unit 147 is cured. In this operation, the temperature is maintained constant or substantially constant. The third subpixel unit 147 is formed by irradiating UV rays through a mask M that exposes only the portion of the liquid crystal composition 140' corresponding to the third subpixel unit 147. Due to the irradiation of UV rays, the optically polymerizable polymer contained in the UV-exposed region is cured, and a helix pitch is fixed such that the reflection wavelength range corresponds to blue light.

Figure 4D:
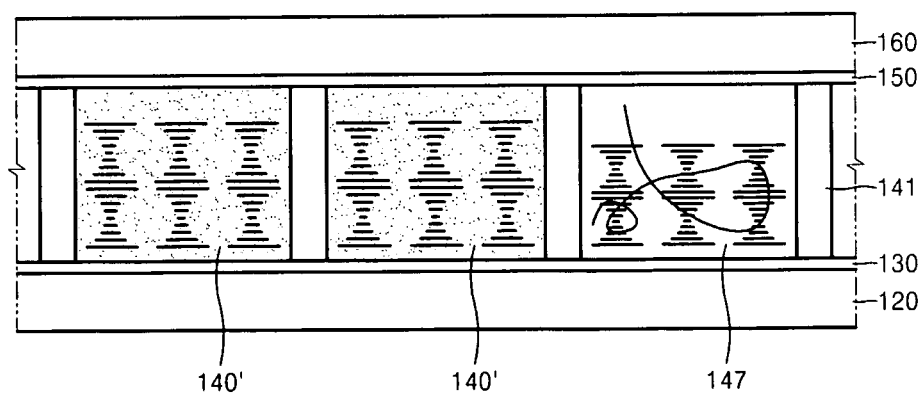

Referring to FIG. 4D, the temperature of the liquid crystal composition 140' is lowered to change the solubility of the chiral dopant. The solubility of the chiral dopant is decreased as the temperature is lowered, and thus, some of the chiral dopant that has been dissolved is precipitated. A decrease in the amount of chiral dopant contained in the liquid crystal composition 140' leads to a longer helix pitch of the cholesteric phase. Thus, the temperature is controlled such that the amount of chiral dopant is adjusted to obtain a helix pitch having a reflection wavelength range corresponding to the green light. In this case, lowering the temperature does not affect the helix pitch of the third subpixel unit 147 that has been fixed by curing the optically polymerizable polymer.

Figure 4E:
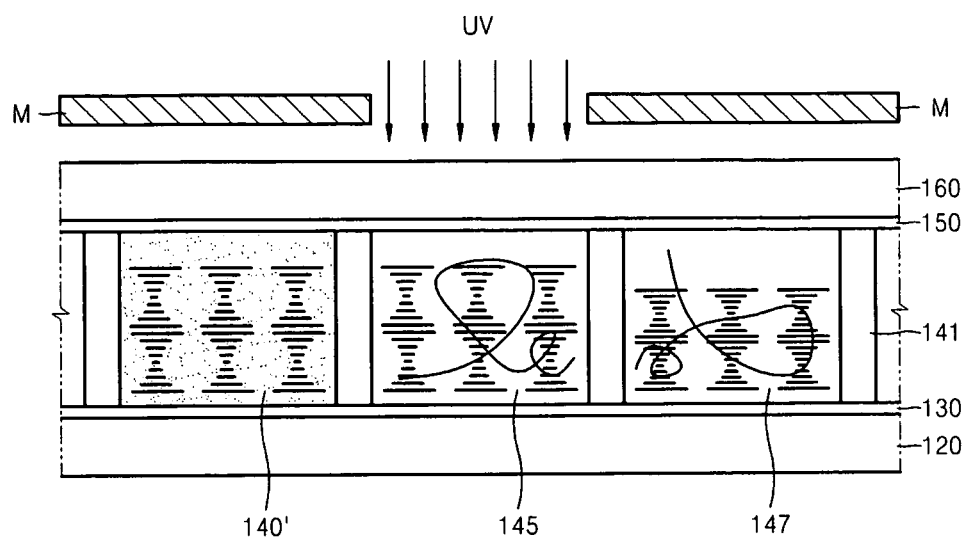

As illustrated in FIG. 4E, UV rays are irradiated through a mask M that exposes only the portion of the liquid crystal composition 140' corresponding to the second subpixel unit 145. In this operation, the temperature used in the operation described with reference to FIG. 4D is maintained constant or substantially constant. In some cases, this operation may be performed together (e.g., concurrently or simultaneously) with the operation described with reference to FIG. 4D. The optically polymerizable polymer in the UV-exposed region is cured and a helix pitch is fixed, thereby forming the second subpixel unit 145 having the reflection wavelength range corresponding to green light. Although, in FIG. 4E, the mask M exposes only the portion of the liquid crystal composition 140' corresponding to the second subpixel unit 145, the mask M may also expose the third subpixel unit 147 because the reflection wavelength range of the third subpixel unit 147 that has been formed by curing with UV rays is not affected by additional irradiation of UV rays.

Figure 4F:
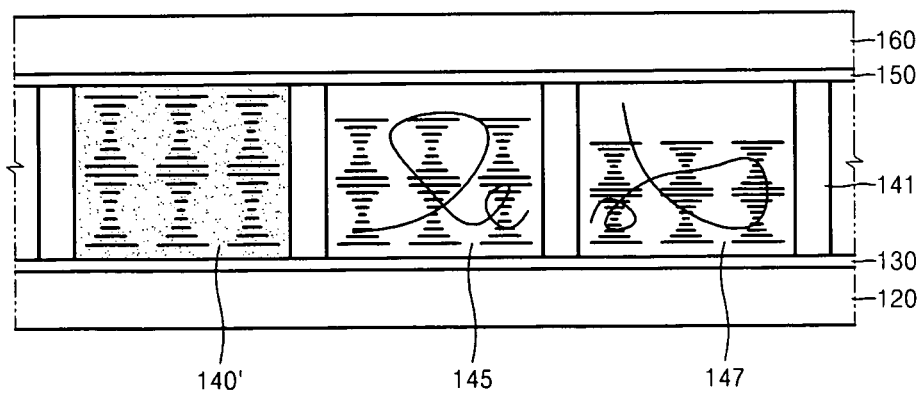

Referring to FIG. 4F, the temperature of the liquid crystal composition 140' is further lowered to further precipitate the dissolved chiral dopant. In this case, the temperature is controlled such that the amount of chiral dopant is adjusted to obtain a helix pitch having a reflection wavelength range corresponding to red light. In this case, the temperature change does not affect the helix pitches of the second subpixel unit 145 and the third subpixel unit 147, which have been fixed by curing the optically polymerizable polymer.

Figure 4G:
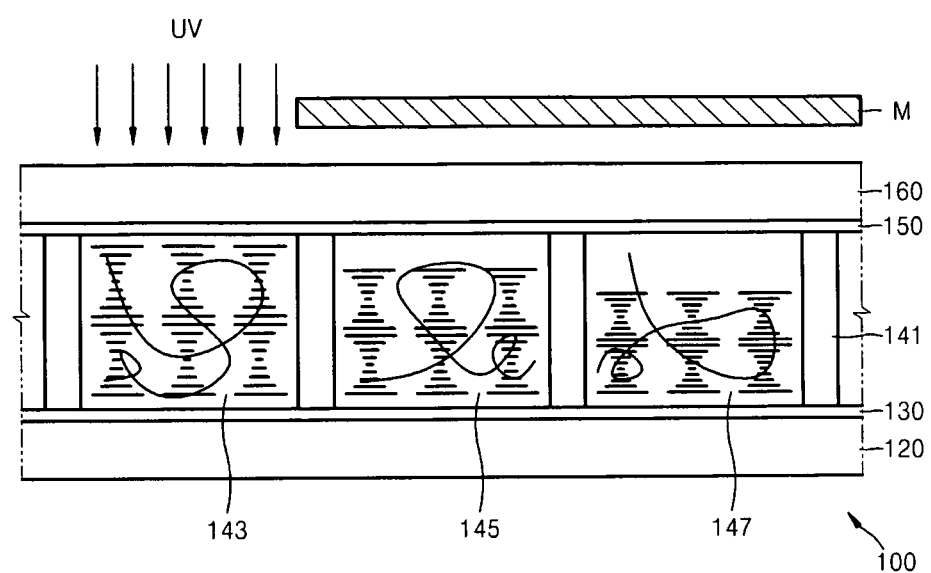

As illustrated in FIG. 4G, UV rays are irradiated through a mask M that exposes only the portion of the liquid crystal composition 140' corresponding to the first subpixel unit 143. In this operation, the temperature used in the operation described with reference to FIG. 4F is maintained constant or substantially constant. In some cases, this operation may be performed together (e.g., concurrently or simultaneously) with the operation described with reference to FIG. 4F. The optically polymerizable polymer in the UV-exposed region is cured and a helix pitch is fixed, thereby forming the first subpixel unit 143 having the reflection wavelength range corresponding to red light. This operation may be performed without the mask M because the second subpixel unit 145 and the third subpixel unit 147, which have been formed by curing with UV rays, are not affected by the additional irradiation of UV rays.

According to at least some example embodiments, cholesteric liquid crystal display devices including a plurality of subpixel units having different reflection wavelength ranges is manufactured. The cholesteric liquid crystal display devices may include a single-layered liquid crystal layer. Due to the single-layered structure, manufacturing costs are relatively low and improved color purity is obtained. In addition, the operation of curing an optically polymerizable polymer contained in a cholesteric liquid crystal layer at different temperatures to form pixels for producing a full-color image is suitable for simplifying a structure process and mass production.

As described above, one or more example embodiments of methods of manufacturing display devices, a liquid crystal composition is processed to form a helix pitch corresponding to red light or blue light. The temperature is then raised or lowered (e.g., gradually raised or lowered). However, the embodiments described herein are examples only. For example, the liquid crystal composition may also be processed to obtain a helix pitch corresponding to light of other colors, and the temperature may be raised or lowered according to operation requirements.

It should be understood that example embodiments described herein should be considered in a descriptive sense only and not for purposes of limitation. Descriptions of features or aspects within each example embodiment should typically be considered as available for other similar features or aspects in other example embodiments.

What is claimed is:

1. A display device comprising:
    a plurality of pixel units arranged two-dimensionally, each of the plurality of pixel units including a cholesteric liquid crystal layer interposed between two transparent substrates, the cholesteric liquid crystal layer having a single-layer structure and including,
    a liquid crystal molecule,
    a chiral dopant mixed with the liquid crystal molecule to form a cholesteric phase, wherein a solubility of the chiral dopant with respect to the liquid crystal molecule varies according to temperature, and
    an optically polymerizable polymer cured to fix a helix pitch of the cholesteric phase, wherein
    each of the plurality of pixel units further includes,
    a plurality of subpixel units having different helix pitches of the cholesteric phase.

2. The display device of claim 1, wherein the plurality of subpixel units comprise:
    a red subpixel unit;
    a green subpixel unit; and
    a blue subpixel unit.

3. The display device of claim 1, wherein the plurality of subpixel units comprise:
    a magenta subpixel unit;
    a yellow subpixel unit; and
    a cyan subpixel unit.

4. The display device of claim 1, wherein barrier ribs for defining the plurality of subpixel units are formed between the two transparent substrates.

5. The display device of claim 1, wherein a light absorption layer is formed on a surface of one of the transparent substrates.

* * * * *

UNITED STATES PATENT AND TRADEMARK OFFICE
CERTIFICATE OF CORRECTION

PATENT NO. : 8,456,594 B2  Page 1 of 1
APPLICATION NO. : 12/659558
DATED : June 4, 2013
INVENTOR(S) : Jae-eun Jang et al.

It is certified that error appears in the above-identified patent and that said Letters Patent is hereby corrected as shown below:

Title page,
item (73) Assignee should read as follows: Samsung Electronics Co., Ltd., Gyeonggi-do (KR)

Industry-University Cooperation Foundation Hanyang University, Seoul (KR)

Signed and Sealed this
Twenty-seventh Day of May, 2014

Michelle K. Lee
*Deputy Director of the United States Patent and Trademark Office*